United States Patent
Su et al.

(10) Patent No.: US 9,898,137 B2
(45) Date of Patent: Feb. 20, 2018

(54) OBJECT POSITIONING METHOD FOR A TOUCH PANEL

(71) Applicant: PIXART IMAGING INC., Hsin-Chu (TW)

(72) Inventors: Tse Chung Su, Hsin-Chu (TW); Ming Hung Tsai, Hsin-Chu (TW); Chi-Chieh Liao, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/598,226

(22) Filed: May 17, 2017

(65) Prior Publication Data

US 2017/0255333 A1    Sep. 7, 2017

Related U.S. Application Data

(60) Division of application No. 15/187,932, filed on Jun. 21, 2016, now abandoned, which is a continuation of application No. 14/198,730, filed on Mar. 6, 2014, now abandoned.

(30) Foreign Application Priority Data

Jul. 3, 2013  (TW) .............................. 102123791 A

(51) Int. Cl.
| | | |
|---|---|---|
| G06F 3/045 | (2006.01) | |
| G06F 3/041 | (2006.01) | |
| G06F 3/044 | (2006.01) | |
| G06F 3/0354 | (2013.01) | |

(52) U.S. Cl.
CPC ........ *G06F 3/0418* (2013.01); *G06F 3/03545* (2013.01); *G06F 3/044* (2013.01)

(58) Field of Classification Search
CPC ................................ G06F 3/0418; G06F 3/044
USPC .......................................................... 345/174
See application file for complete search history.

(56) References Cited

U.S. PATENT DOCUMENTS

| | | |
|---|---|---|
| 5,543,591 A | 8/1996 | Gillespie et al. |
| 2002/0015024 A1 | 2/2002 | Westerman et al. |
| 2007/0040800 A1 | 2/2007 | Forlines et al. |
| 2010/0079430 A1 | 4/2010 | Yamashita et al. |
| 2011/0074694 A1 | 3/2011 | Rapp et al. |
| 2011/0191723 A1 | 8/2011 | Wu et al. |
| 2012/0306820 A1 | 12/2012 | Yu |

FOREIGN PATENT DOCUMENTS

| | | |
|---|---|---|
| CN | 1885248 A | 12/2006 |
| CN | 101308416 A | 11/2008 |
| CN | 101963862 A | 2/2011 |

(Continued)

*Primary Examiner* — Jonathan Blancha
(74) *Attorney, Agent, or Firm* — Li & Cai Intellectual Property (USA) Office

(57) ABSTRACT

An object positioning method for touch panel is disclosed. In the method, an amount of sensing of a sensing signal can be detected and a sensing coordinate of an object can be obtained based on the detection. A positioning coordinate of the object can be locked in a point-locked mode when the amount of sensing of the sensing signal decreases continuously to be larger than a first threshold time and the amount of sensing of the sensing signal is smaller than a first sensing threshold value. Otherwise, the point-locked mode of the positioning coordinate of the object can be unlocked when the amount of sensing of the sensing signal is larger than a first sensing threshold value.

12 Claims, 8 Drawing Sheets

(56) References Cited

FOREIGN PATENT DOCUMENTS

| | | |
|---|---|---|
| CN | 101714331 B | 10/2012 |
| TW | 201104665 A | 2/2011 |
| TW | 201209671 A1 | 3/2012 |
| TW | 201250549 A | 12/2012 |
| TW | I391851 B1 | 4/2013 |

OBJECT POSITIONING METHOD FOR A TOUCH PANEL

CROSS-REFERENCE TO RELATED APPLICATION

The present application is a divisional application of U.S. application Ser. No. 15/187,932, filed on Jun. 21, 2016, which is a continuation application of U.S. application Ser. No. 14/198,730, filed on Mar. 6, 2014, and entitled "TOUCH POSITIONING METHOD FOR TOUCH PANEL", the entire contents of which are hereby incorporated by reference.

BACKGROUND OF THE INVENTION

1. Field of the Invention

The instant disclosure relates to an object positioning method; in particular, to the object positioning method applied to a touch panel.

2. Description of Related Art

With a continuous advancement in technology, various types of touch panel are widely used in notebook computers, smart phones, tablet PCs and multimedia player tablet. The touch panel is human-machine interface systems that user can control one or more electronic system through touching a touch-pad or display screen. Furthermore, the electronic system generates some responses for behavior of touch (command inputted by the user) through pressing method of different location or different types for touch panel. There are many kinds of sensing method for the touch panel, such as capacitive sensing, resistive sensing, acoustic wave or light wave sensing, wherein the capacitive touch panel has an advantage of positioning precisely, the technology of the capacitive touch panel is widely used in market. Basically, the main working mechanism of the capacitive touch panel is to determine position and movement trajectory of the object. The structure of the touch panel can be simply divided into upper and lower surfaces of the electrodes respectively formed by the electrode lines interlaced. When finger of the user touch the screen, an extremely small capacitor is formed between the electrode lines and user's finger, and thus position touched by the user can determined through detecting change of capacitor value.

However, capacitance value measured by a traditional capacitive touch panel not only includes amount of sensing of capacitance generated from screen touched by the user, but also noise generated from some environment factors. The noise may affect amount of sensing of capacitance, wherein the environment factors can be exemplary as high-frequency interference sources, change of surrounding environment or electrostatic discharge. Accordingly, when the capacitive touch panel detects a sensing signal, the sensing signal will be affected by the noise so that a misjudgment will occur. For example, when the user utilizes a finger to touch the touch panel and to slide and drag on the screen, phenomenon of jitter or dither may be generated due to noise, so that the electronic system cannot precisely response for behavior of touch (command inputted by the user)

SUMMARY OF THE INVENTION

In view of this, an object positioning method used for a touch panel provided by the instant disclosure is able to resolve an object trajectory distortion of a coordinate misjudgment caused by environmental noise, and elevates accuracy and stability of capacitive touch panel in sensing object's trajectory.

The instant disclosure provides an object positioning method of a touch panel. The object positioning method comprises steps as follows: recording a positioning coordinate of an object; acquiring a sensing coordinate of the object according to calculation of a sensing signal; acquiring a motion estimation vector according to calculation of the positioning coordinate and the sensing coordinate; determining whether length of the motion estimation vector is smaller than a predetermined distance; and entering into a point-locked mode, if length of the motion estimation vector is smaller than the predetermined distance.

In an embodiment of the present invention, the object positioning method further comprises step as follows: if length of the motion estimation vector is larger than the predetermined distance, updating the positioning coordinate and then outputting the positioning coordinate.

In an embodiment of the present invention, wherein the step of updating position of the positioning coordinate further comprises steps as follows: calculating an object movement vector of the object according to the predetermined distance and the motion estimation vector; and updating the positioning coordinate to a position of sum of the positioning coordinate and the object movement vector, wherein direction vector of the object movement vector is unit vector of the motion estimation vector, and magnitude of the object movement vector is that the predetermined distance subtracted by the length of the motion estimation vector.

In an embodiment of the present invention, wherein step of entering into the point-locked mode further comprises step as follows: outputting the positioning coordinate and returning to step of acquiring the sensing coordinate of the object according to calculation of the sensing signal.

In an embodiment of the present invention, wherein before step of recording the positioning coordinate of the object further comprises step as follows: detecting and confirming that the object touches the touch panel, wherein the touch panel is capacitive touch panel and the amount of change of capacitance of the capacitive touch panel is transformed to the sensing signal by a control circuit.

In an embodiment of the present invention, wherein after step of the length of the motion estimation vector being smaller than the predetermined distance further comprises step as follows: locking the positioning coordinate of the object.

From another point of view, the instant disclosure provides an object positioning method used for a touch panel. The object positioning method comprises steps as follows: detecting amount of sensing of a sensing signal; and locking a positioning coordinate of an object, when amount of sensing of the sensing signal decreases continuously to be larger than a first threshold time and amount of sensing of the sensing signal is smaller than a first sensing threshold value.

In an embodiment of the present invention, the object positioning method comprises step as follows: unlocking the point-locked mode of the positioning coordinate of the object when amount of sensing of the sensing signal is larger than a first sensing threshold value, under a situation of the positioning coordinate of the object in the point-locked mode.

In an embodiment of the present invention, wherein when amount of sensing of the sensing signal decreases continuously, an average value of amount of sensing of N sample sensing signal for N time-points is served as amount of sensing of the sensing signal, wherein N is a positive integer larger than one.

In an embodiment of the present invention, wherein an amount of change of capacitance of the touch panel is transformed to amount of sensing of the sensing signal via a control circuit.

From another more point of view, the instant disclosure provides an object positioning method used for a touch panel. The object positioning method comprises steps as follows: recording a positioning coordinate of an object; detecting amount of sensing of a sensing signal; acquiring a sensing coordinate of the object according to calculation of a sensing signal; acquiring a motion estimation vector according to calculation of the positioning coordinate and the sensing coordinate; determining whether length of the motion estimation vector is smaller than a predetermined distance; outputting the positioning coordinate, if length of the motion estimation vector is smaller than the predetermined distance; locking the positioning coordinate of the object, when amount of sensing of the sensing signal decreases continuously to be larger than a first threshold time and amount of sensing of the sensing signal is smaller than a first sensing threshold value; and unlocking the point-locked mode of the positioning coordinate of the object when amount of sensing of the sensing signal is larger than a first sensing threshold value, under a situation of the positioning coordinate of the object in the point-locked mode.

The instant disclosure provides an object positioning method used for a touch panel. The object positioning method comprises steps as follows: recording a positioning coordinate of an object; acquiring a sensing coordinate of the object according to calculation of a sensing signal; acquiring a motion estimation vector according to calculation of the positioning coordinate and the sensing coordinate; determining whether length of the motion estimation vector is smaller than a predetermined distance; calculating an object movement vector of the object according to the predetermined distance and the motion estimation vector, if length of the motion estimation vector is larger than predetermined distance; and updating the positioning coordinate to a position of sum of the positioning coordinate and the object movement vector, wherein direction vector of the object movement vector is unit vector of the motion estimation vector, and magnitude of the object movement vector is that the predetermined distance subtracted by the length of the motion estimation vector.

In summary, an object positioning method used for a touch panel provided by the instant disclosure is able to acquire a motion estimation vector according to calculation of the positioning coordinate and the sensing coordinate, and then update the positioning coordinate of an object according to comparison result generated from comparison of the motion estimation vector and a predetermined distance, so as to reduce interference of jitter and hop of the object caused by the noise.

For further understanding of the present invention, reference is made to the following detailed description illustrating the embodiments and examples of the present invention. The description is only for illustrating the present invention, not for limiting the scope of the claim.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[Embodiment of Object Positioning Method for Capacitive Touch Panel]

Figure 1:
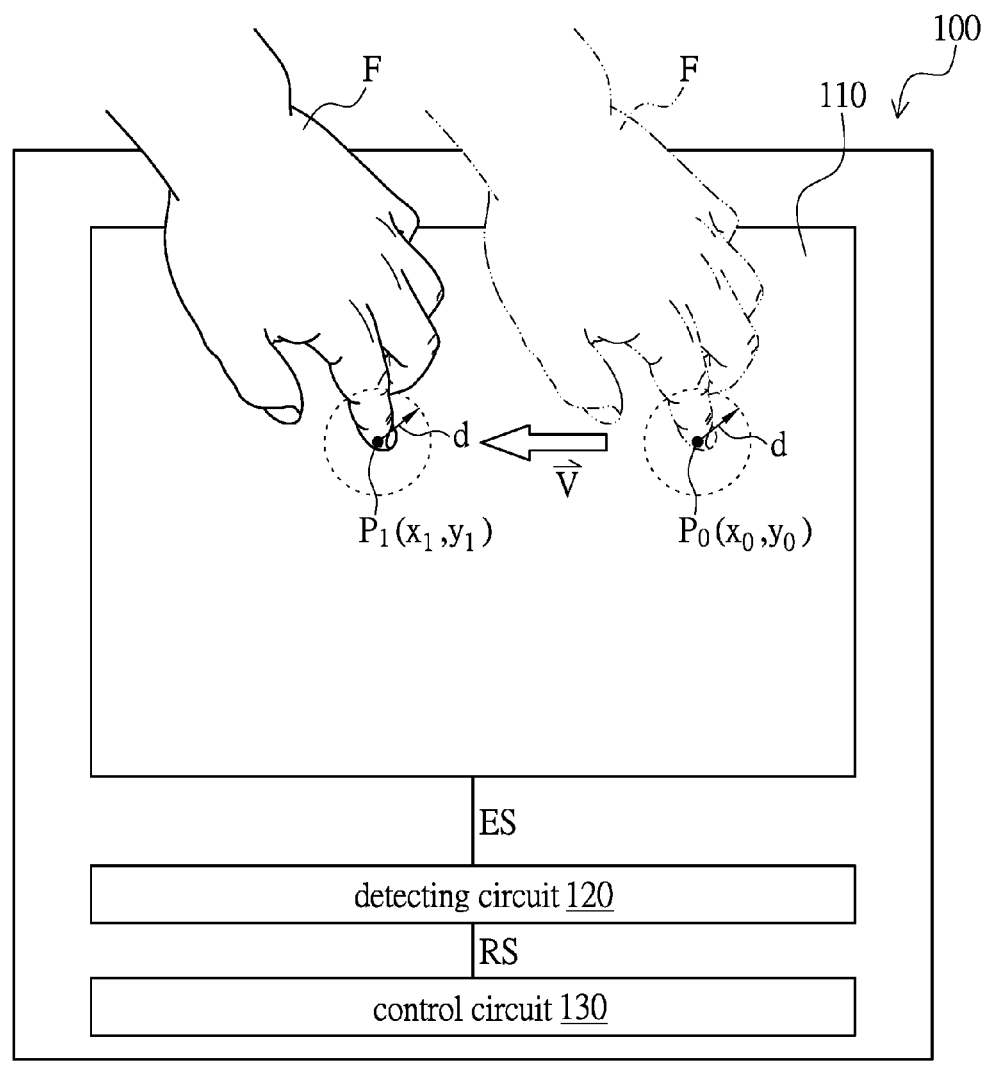
FIG. 1 shows a schematic view of capacitive touch panel according to one embodiment of the instant disclosure.

Referring to FIG. 1, FIG. 1 shows a schematic view of capacitive touch panel according to one embodiment of the instant disclosure. As shown in FIG. 1, the touch panel 100 comprises a sensing module 110, a detecting circuit 120 and a control circuit 130. The sensing module 110 is electrically connected to detecting circuit 120, and detecting circuit 120 is electrically connected to the control circuit 130. In the present embodiment, the touch panel 100 is a capacitive touch panel, therefore the sensing module 110 generates a sensing signal ES through amount of sensing of capacitance. The detecting circuit 120 is used for detecting the amount of change of capacitance of the sensing module 110 so as to receive the sensing signal ES, and outputting a detecting result RS to the control circuit 130 so that the control circuit 130 may further execute related judgments and calculations about the positioning coordinate and the sensing coordinate. Generally speaking, when user utilizes the object to click the touch panel 100 or slide on the touch panel 100, the sensing signal ES received by the sensing module 110 of the touch panel 100 detected by the detecting circuit 120 may comprises amount of sensing of capacitance and noise generated by the environmental factor. Calculations and judgments of the control circuit 130 may be interference by the environmental noise, so sensing signal ES is usually a signal overlapped by the amount of sensing of capacitance and noise generated by the environmental factor.

Figure 2:
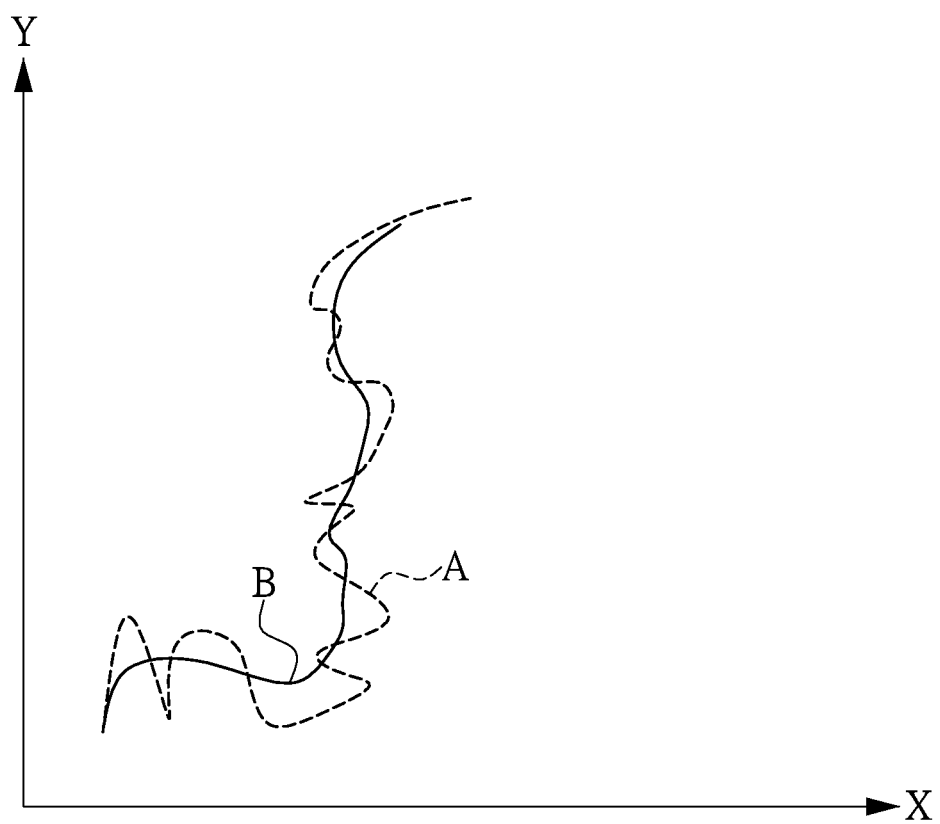
FIG. 2 shows a schematic view of object trajectory before and after the process of the capacitive touch panel in FIG. 1.

Furthermore, referring to FIGS. 1 and 2 concurrently, FIG. 2 shows a schematic view of object trajectory before and after the process of the capacitive touch panel in FIG. 1. When user utilizes the object to click the touch panel 100 or slide on the touch panel 100, an object trajectory A is an original trajectory of the object F without process of an object positioning program stored in the control circuit 130 and an object trajectory B is an trajectory of the object F with process of an object positioning program stored in the control circuit 130. The difference between the object trajectory A and the object trajectory B is that the object trajectory A formed by the sensing signal ES is affected by interference of a large number of environmental noise, therefore the object trajectory A may deviate real trajectory of the object significantly. Accordingly, through adjustment of the object positioning method provided by the instant disclosure, object trajectory A may be amended to object trajectory B so as to close to real trajectory of the object, and then reduce noise effect generated by the surrounding environment. It is to be noted that, in the present embodiment, the object utilized by the user may be a finger F, and in another embodiment, the object may be a stylus, but the instant disclosure is not restricted thereto. For further understanding the object positioning method of the instant disclosure, there are at least one embodiment for further instruction as the below.

Referring to FIG. 1, When user utilizes the object (e.g. a finger or a stylus) to click the touch panel 100 or slide on the touch panel 100, the capacitor of the sensing module 110 may generate the amount of change of capacitance and form the sensing signal ES with a continuous curve followed by noise. Next, the detecting circuit 120 may detect the sensing signal ES and then transmit a result RS with the continuous curve to the control circuit 130, and that after the control circuit 130 determines and confirms the object F touches the touch panel 100, the control circuit 130 records positioning coordinate $P_0(x_0,y_0)$ initial of the object F. The control circuit 130 calculates the sensing coordinate $P_1(x_1,y_1)$ of the object F according to the detecting result RS which is corresponding to sensing signal ES with the continuous curve. It is worth to be noticed that the sensing coordinate $P_1(x_1,y_1)$ may be not where the object F locates, and the sensing coordinate $P_1(x_1,y_1)$ is a coordinate superposed by noise and the amount of sensing of capacitance touched by the object F. Next, the control circuit 130 may initially calculate a motion estimation vector $\vec{V}$ according to the positioning coordinate $P_0(x_0,y_0)$ and the sensing coordinate $P_1(x_1,y_1)$, wherein motion estimation vector $\vec{V}$ is a vector $\overrightarrow{P_0P_1}$ $(x_1-x_0,y_1-y_0)$. In the present embodiment, the control circuit 130 may compare a predetermined distance d with the length of the motion estimation vector $\vec{V}$ (as shown in equation (1)), wherein the predetermined distance d is a distance outwardly extending from a center defined by the positioning coordinate $P_0(x_0, y_0)$ and the predetermined distance d may be viewed as a radius outwardly extending from a center defined by the positioning coordinate $P_0(x_0, y_0)$. The user may set actual value of the predetermined distance d according to actual application demand, and the instant disclosure is not restricted by setting of actual value.

$$|\vec{V}|=\sqrt{(x_1-x_0)^2+(y_1-y_0)^2} \quad (1)$$

Next, if the control circuit 130 determines that length of the motion estimation vector $\vec{V}$ is smaller than predetermined distance d, it means that generation of the sensing coordinate $P_1(x_1,y_1)$ may be affected mainly by noise, and then the control circuit 130 determines the object F does not do any movement so as to output the positioning coordinate $P_0(x_0,y_0)$ for the confirmation result of coordinate. Additionally, if the control circuit 130 determines that length of the motion estimation vector $\vec{V}$ is larger than predetermined distance d, it means that generation of the sensing coordinate $P_1(x_1,y_1)$ may be mostly affected by the amount of sensing of capacitance (i.e. probability of real movement about the object F is higher) and accordingly the control circuit 130 may update a position of the positioning coordinate $P_0(x_0, y_0)$ for the confirmation result of coordinate. Therefore, the control circuit 130 may sequentially amend the object trajectory B to the object trajectory A in FIG. 2, so as to reduce effect of noise interference generated form the surrounding environment and then eliminate the disadvantages of jitter or dither.

In the following description is further instruction in teaching working mechanism object positioning method, for understanding the instant disclosure.

Figure 3:
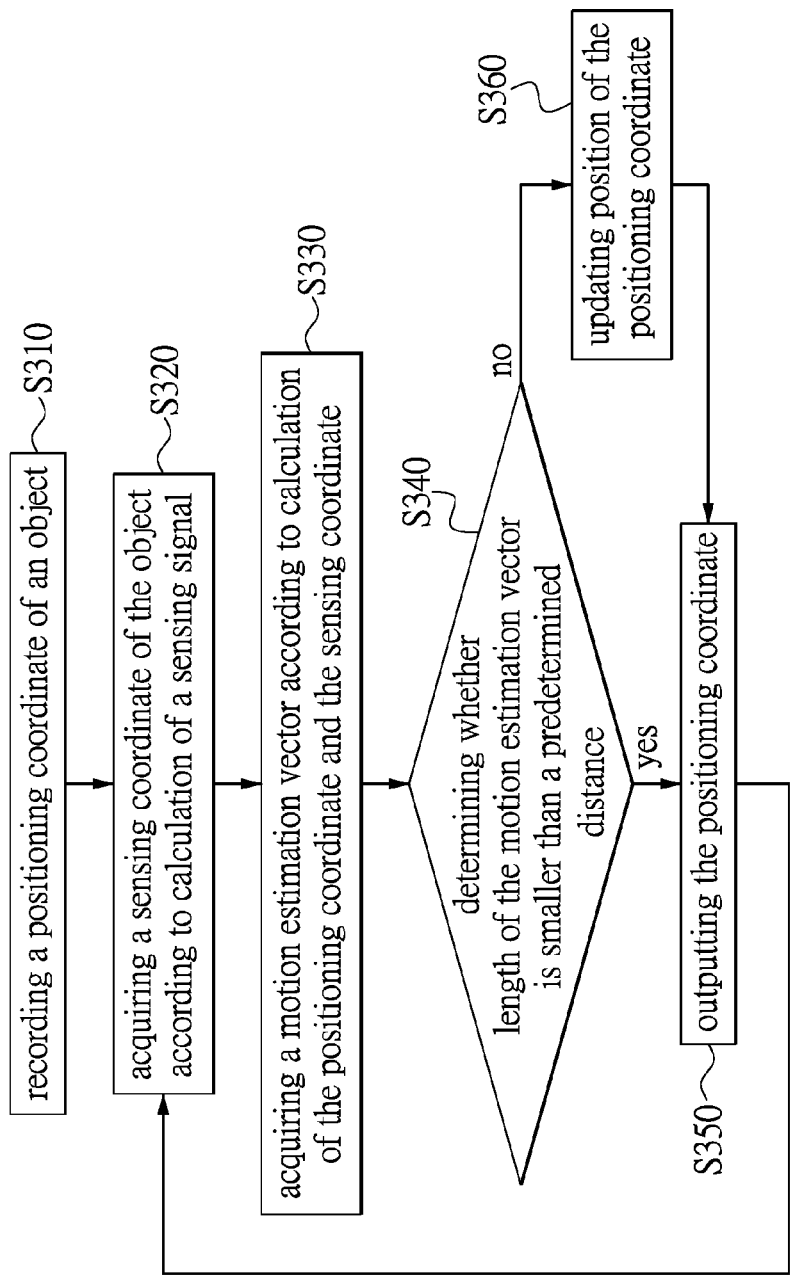
FIG. 3 shows a flow diagram of the object positioning method according to embodiment of the instant disclosure.
Figure 4A:
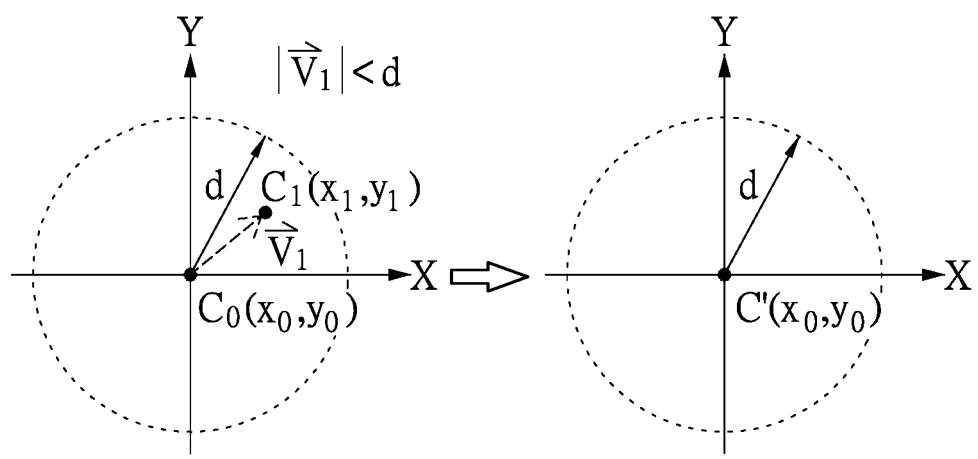
FIG. 4A shows a schematic diagram of the object positioning method applied for the capacitive touch panel according to embodiment of the instant disclosure.
Figure 4B:
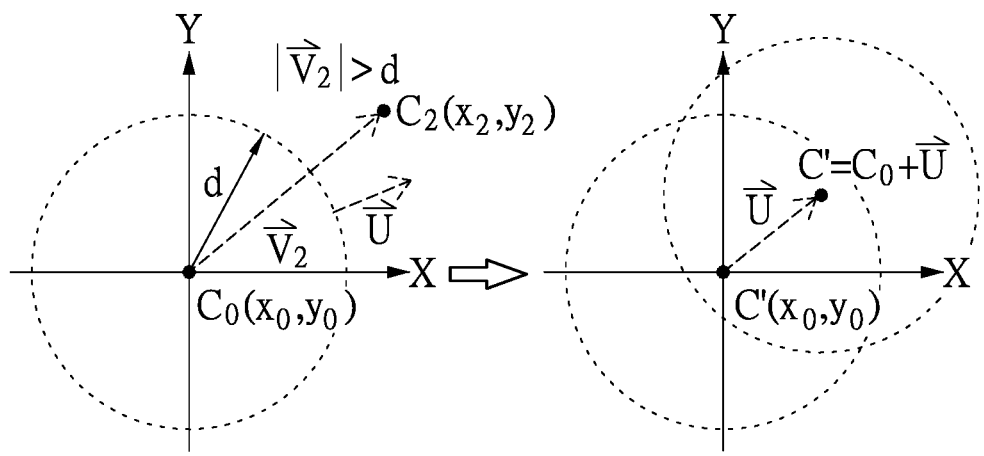
FIG. 4B shows another schematic diagram of the object positioning method applied for the capacitive touch panel according to embodiment of the instant disclosure.

Referring to FIGS. 1, 3~4B concurrently, FIG. 3 shows a flow diagram of the object positioning method according to embodiment of the instant disclosure. FIG. 4A shows a schematic diagram of the object positioning method applied for the capacitive touch panel according to embodiment of the instant disclosure. FIG. 4B shows another schematic diagram of the object positioning method applied for the capacitive touch panel according to embodiment of the instant disclosure. As shown in the embodiment of FIG. 3, the object positioning method comprises steps as follows: recording an positioning coordinate of an object (step S310); acquiring the sensing coordinate of the object according to calculation of the sensing signal (step S320); acquiring an motion estimation vector according to the positioning coordinate and the sensing coordinate (step S330); determining whether length of the motion estimation vector is smaller than the predetermined distance (step S340); outputting the positioning coordinate (step S350); updating the position of the positioning coordinate (step S360). The following will sequentially describe each step of the object positioning method in order to understand the contents of this disclosure.

In step S310, when user utilizes the object (e.g. finger or stylus) to click the touch panel 100 or slide on the touch panel 100, the control circuit 130 may record an initial coordinate of the touch panel 100 just touched by the object F to be served as the positioning coordinate $P_0(x_0,y_0)$ and then the process enters into step S320. Before the following instruction, it is clarified that, the sensing signal ES detected by the detecting circuit 120 may be a signal superposed by the sensing of capacitance and noise. The detecting circuit 120 may transmit the detecting result RS to the control circuit 130 so as to adjust or amend object trajectory, for avoid distortion of object trajectory leading to misjudgment of the control circuit 130. Furthermore, the control circuit 130 has a plurality of control commands and the control commands are written into the firmware to the control circuit 130 and the control circuit 130 proceeds calculation, judgment and further related control according to an object positioning program (i.e. control command) formed by the object positioning method. The control circuit 130 may also be implemented the digital signal processor (DSP) and directly perform related function without performing any form of firmware or software.

In step S320, the detecting circuit 120 may periodically detect or sample a signal superposed by the sensing of capacitance of the sensing module 110 of the sensing module 110 with a fixed period, and transmit the detecting result RS detected to the control circuit 130. Next, the control circuit 130 may perform calculations for acquiring sensing coordinate $P_1(x_1,y_1)$ of the object F according to detecting result RS corresponding to the sensing signal ES. It is worth mentioning that the fixed period used for detecting or sampling by the detecting circuit 120 may be designed by the user according to actual application, and value setting of the fixed period is not restricted in the instant disclosure. Next, the process enters into step S330.

In step S330, the control circuit 130 may perform calculation based on positioning coordinate $P_0(x_0,y_0)$ acquired from step S310 and the sensing coordinate $P_1(x_1,y_1)$ acquired from step S320 for acquiring a motion estimation vector $\vec{V}$ according to the object positioning program (i.e. control command), wherein the motion estimation vector $\vec{V}$ is a vector $\overrightarrow{P_0P_1}$ $(x_1-x_0, y_1-y_0)$. Next, the process enters into step S340.

In step S340, the control circuit 130 calculates length of the motion estimation vector $\vec{V}$ according to the object positioning program (i.e. control command) at this stage, as shown in equation (1). Next, the control circuit 130 starts to perform decision judgment; which means that the control circuit 130 starts to determine whether length of the motion estimation vector $\vec{V}$ is smaller than the predetermined distance d, wherein the predetermined distance d is a distance outwardly extending from a center defined by the positioning coordinate $P_0(x_0, y_0)$, and the redundant description is thus omitted. If the control circuit 130 determines length of the motion estimation vector $\vec{V}$ is smaller than the predetermined distance d, the process enters into step S350. In the other hand, if the control circuit 130 determines length of the motion estimation vector $\vec{V}$ is larger than the predetermined distance d, the process enters into step S360. It is worth mentioning that if the control circuit 130 determines length of the motion estimation vector $\vec{V}$ is equal to the predetermined distance d, the designer may determine the process enters into step S350 or step S360 at design phase for avoiding malfunction of the control circuit 130 while length of the motion estimation vector $\vec{V}$ is equal to the predetermined distance d.

In step S350, referring to FIG. 4A concurrently for understanding operation of the step S350. Embodiment of FIG. 4A shows that the control circuit 130 acquire a positioning coordinate $C_0(x_0,y_0)$ in step S310 and a sensing coordinate $C_1(x_1,y_1)$ in step S320, and then the control circuit 130 acquires a motion estimation vector $\vec{V}_1$ according to calculation of positioning coordinate $C_0(x_0,y_0)$ and the sensing coordinate $C_1(x_1,y_1)$ in step S330, wherein length of the motion estimation vector $|\vec{V}_1|$ is acquired by the control circuit 130 in step S340. When length of the motion estimation vector $|\vec{V}_1|$ is smaller than the predetermined distance d, it means that generation of the sensing coordinate $C_1(x_1,y_1)$ is mostly affected by noise and therefore the control circuit 130 determines the object F does not do any movement and then outputs the positioning coordinate $C'(x_0,y_0)$ for replacing original positioning coordinate $C_0(x_0,y_0)$, wherein the positioning coordinate $C'(x_0,y_0)$ outputted and the positioning coordinate $C_0(x_0,y_0)$ original are the same coordinate in the plane. Afterwards, the object positioning method will return back to step S320, and the detecting circuit 120 may continuously detect or sample the sensing signal ES of the sensing module 110 with a fixed period.

In step S360, referring to FIG. 4B concurrently for understanding operation of the step S360. Embodiment of FIG. 4B shows that the control circuit 130 acquire a positioning coordinate $C_0(x_0,y_0)$ in step S310 and a sensing coordinate $C_2(x_2,y_2)$ in step S320, and then the control circuit 130 acquires a motion estimation vector $\vec{V}_2$ according to calculation of positioning coordinate $C_0(x_0,y_0)$ and the sensing coordinate $C_2(x_2,y_2)$ in step S330, wherein length of the motion estimation vector $|\vec{V}_2|$ is acquired by the control circuit 130 in step S340. When length of the motion estimation vector $|\vec{V}_2|$ is larger than the predetermined distance d, it means that generation of the sensing coordinate $C_2(x_2,y_2)$ is mostly affected by the amount of sensing of capacitance; which further means, probability of actual movement for the object F is higher, wherein the judgment of probability comes from setting and calculation of the predetermined distance d. Next, position of the positioning coordinate $C_0(x_0,y_0)$ will be updated by the control circuit 130. Furthermore, the control circuit may calculate and acquire an object movement vector $\vec{U}$ according to the predetermined distance d, a positioning coordinate $C_0(x_0,y_0)$ and a sensing coordinate $C_2(x_2,y_2)$. In other words, the control circuit 130 may calculate and acquire an object movement vector $\vec{U}$ from the motion estimation vector $\vec{V}_2$, the length of the motion estimation vector $|\vec{V}_2|$ and the predetermined distance d according to the object positioning program (i.e. control command) so as to decide magnitude and direction of the object trajectory, as shown in equation (2). $|\vec{V}_2|-d$ of the equation indicates an effective distance of movement of the object F (i.e. magnitude of the object movement vector $\vec{U}$), and unit vector $\vec{V}_2/|\vec{V}_2|$ of the motion estimation vector $\vec{V}_2$ indicates an effective direction of movement of the object F (i.e. direction of the object movement vector $\vec{U}$). Next, the control circuit 130 performs a vector operation so as to update position of the positioning coordinate $C_0(x_0,y_0)$; which means, the control circuit 130 updates the positioning coordinate $C_0(x_0,y_0)$ according to the object movement vector $\vec{U}$, and position of the positioning coordinate updated C' is a position of sum of the original positioning coordinate $C_0(x_0,y_0)$ and object movement vector $\vec{U}$, as shown in equation (3). Next, the process enters into step S350 and outputs the positioning coordinate updated C'

$$\vec{U} = \frac{\vec{V_2}}{|\vec{V_2}|} \times (|\vec{V_2}| - d) \quad (2)$$

$$C' = C0 + \vec{U} \quad (3)$$

It is to be clarified that, each step of embodiment in FIG. 3 is set for a need to instruct easily, and thus the sequence of the steps is not used as a condition in demonstrating the embodiments of the instant disclosure.

For specific instruction of an operation flow of the object positioning method of the instant disclosure, there is at least one embodiment recited below for further instruction.

In the following embodiments, there are only parts different from embodiments in FIG. 3 described, and the omitted parts are indicated to be identical to the embodiments in FIG. 3. In addition, for an easy instruction, similar reference numbers or symbols refer to elements alike.

[Another Embodiment of Object Positioning Method of the Capacitive Touch Panel]

Figure 5:
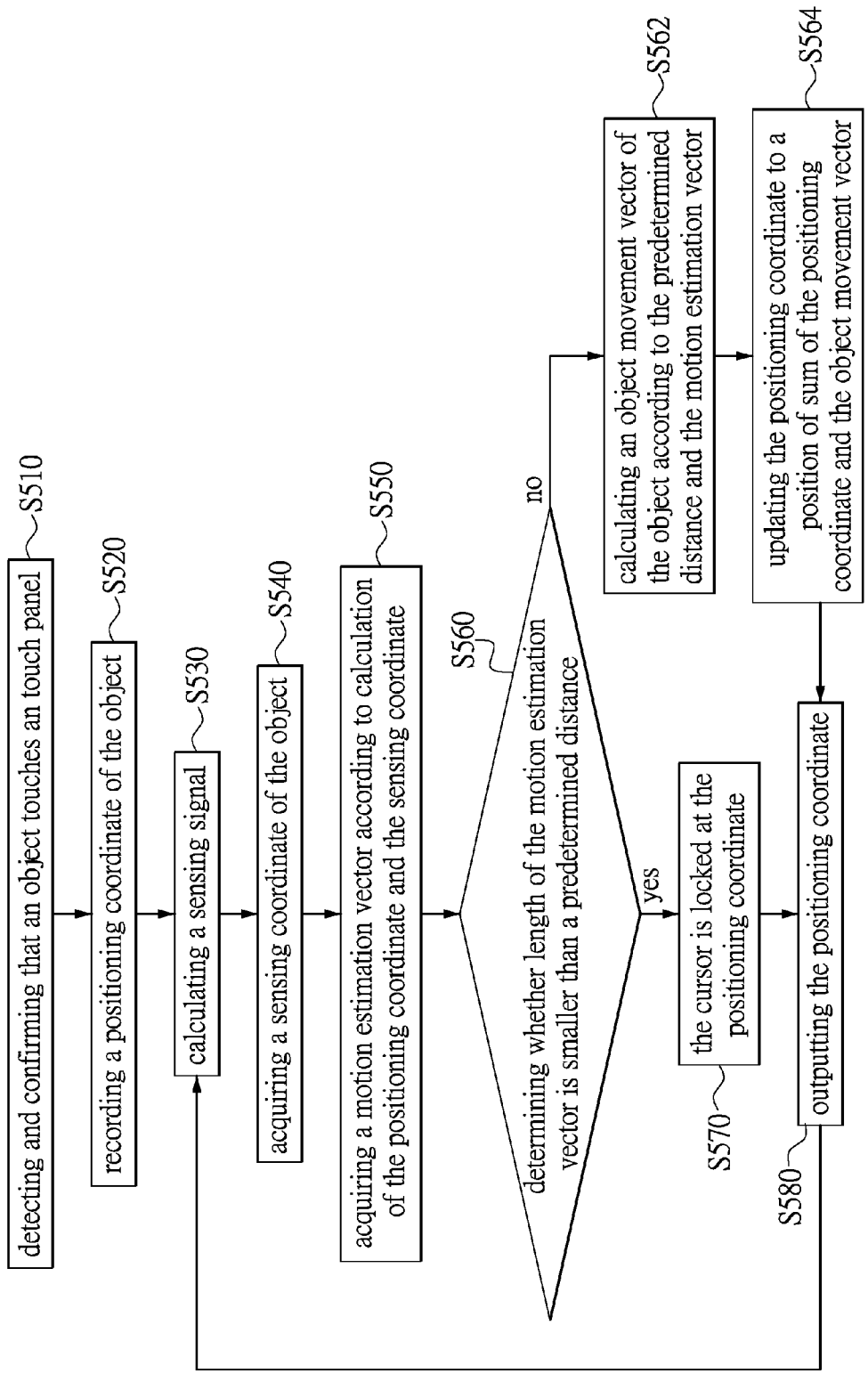
FIG. 5 shows flow diagram of the object positioning method according to another embodiment of the instant disclosure.

Referring to FIGS. 1 and 5, FIG. 5 shows flow diagram of the object positioning method according to another embodiment of the instant disclosure. As shown in FIG. 5, the object positioning method comprises steps as follows: detecting and confirming that an object touches an touch panel (step S510); recording a positioning coordinate of the object (step S520); calculating a sensing signal (step S530); acquiring a sensing coordinate of the object (step S540); acquiring a motion estimation vector according to calculation of the positioning coordinate and the sensing coordinate (step S550); determining whether length of the motion estimation vector is smaller than a predetermined distance (step S560); calculating an object movement vector of the object according to the predetermined distance and the motion estimation vector (step S562); updating the positioning coordinate to a position of sum of the positioning coordinate and the object movement vector (step S564); the cursor is locked at the positioning coordinate (step S570); and the cursor is locked at the positioning coordinate (step S580). Compared to flow diagram of embodiment in FIG. 3, step S520 of embodiment in FIG. 5 is equal to step S310 of embodiment in FIG. 3, steps S530 and S540 of embodiment in FIG. 5 is equal to step S320 of embodiment in FIG. 3, step S550 of embodiment in FIG. 5 is equal to step S330 of embodiment in FIG. 3, step S560 of embodiment in FIG. 5 is equal to step S340 of embodiment in FIG. 3, and step S580 of embodiment in FIG. 5 is equal to step S350 of embodiment in FIG. 3. Their similarities (e.g. its related operations) may be understood from the above described embodiment in FIG. 3.

Difference from above-described embodiment in FIG. 3, firstly in step S510, the control circuit 130 may detect and confirm the object F touches the touch panel 100 via the detecting circuit 120, and accordingly the control circuit 130 may perform action of an initialization; which means, the first position touched by the object F is initially set to a positioning coordinate. Moreover, in step S570, when control circuit 130 determines length of the motion estimation vector is smaller than a predetermined distance according to decision of judgment, the control circuit 130 may lock a position touched by the object F, and its corresponding cursor may be locked at the position of the positioning coordinate. In the other hand, in steps S562 and S564, when control circuit 130 determines length of the motion estimation vector is larger than the predetermined distance according to decision of judgment, the control circuit 130 calculates object movement vector of the object F according to the predetermined distance and magnitude and direction of the motion estimation vector, as show in equation (2). Afterwards, the control circuit 130 may update positioning coordinate $C_0(x_0, y_0)$ according to the object movement vector $\vec{U}$, as shown in equation (3). Next, the process enters into step S580 and outputs positioning coordinate updated C', there is no need to describe the other contents.

It is to be clarified that, each step of embodiment in FIG. 5 is set for a need to instruct easily, and thus the sequence of the steps is not used as a condition in demonstrating the embodiments of the instant disclosure.

In the following embodiments, there are only parts different from embodiments in FIG. 5 described, and the omitted parts are indicated to be identical to the embodiments in FIG. 5. In addition, for an easy instruction, similar reference numbers or symbols refer to elements alike.

[Yet Another Embodiment of Object Positioning Method of the Capacitive Touch Panel]

Figure 6:
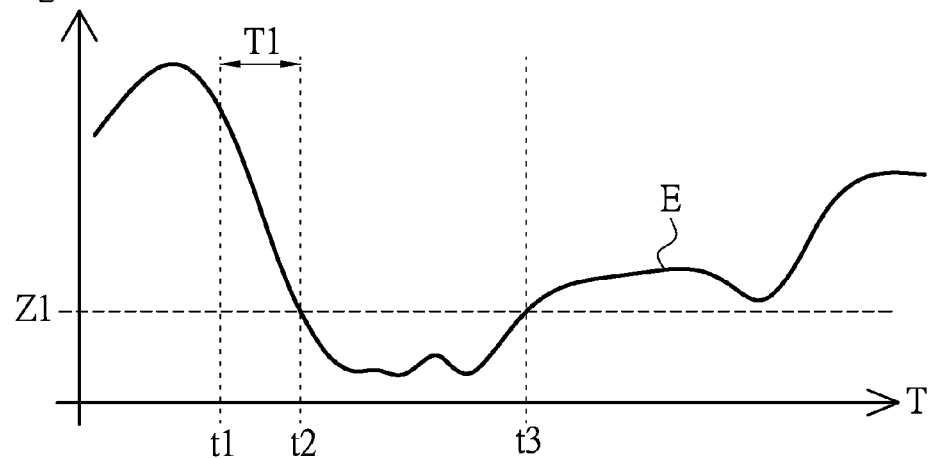
FIG. 6 shows a curve view of amount of sensing according to yet another embodiment of the instant disclosure.
Figure 7:
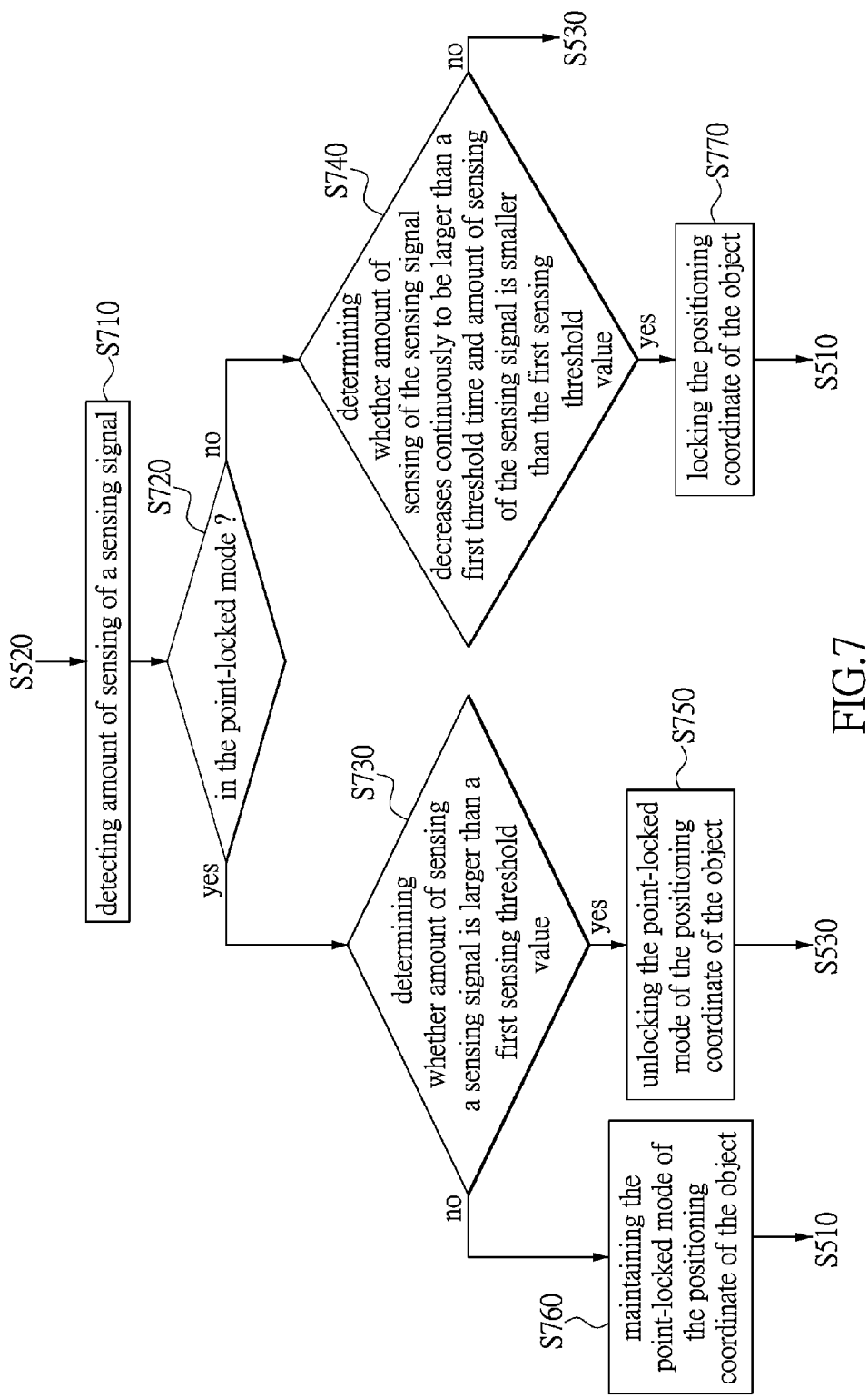
FIG. 7 shows a flow diagram of the object positioning method according to yet another embodiment of the instant disclosure.

After user utilizes the object to slide the sensing module 110 and then the object leaves from the surface of the touch panel (the transient period), amount of sensing of capacitance may continuously decrease and position of the positioning coordinate final determined by the control circuit 130 will be affected by the noise interference. Accordingly, an object positioning method is provided by the instant disclosure for a situation; which means, when the object leaves from a surface of the touch panel, the instant disclosure performs a point-locked mode for the positioning coordinate final via two threshold conditions so as to avoid misjudgment of the positioning coordinate final for the control circuit 130. Referring to FIGS. 1, 6 and 7, FIG. 6 shows a curve view of amount of sensing according to yet another embodiment of the instant disclosure. FIG. 7 shows a flow diagram of the object positioning method according to yet another embodiment of the instant disclosure. As shown in FIG. 7, the object positioning method comprises steps as follows: detecting amount of sensing of a sensing signal (step S710); determining whether in the point-locked mode (step S720); determining whether amount of sensing of a sensing signal is larger than a first sensing threshold value (step S730); determining whether the period that the amount of sensing of the sensing signal decreases continuously to be larger than a first threshold time and amount of sensing of the sensing signal is smaller than the first sensing threshold value (step S740); unlocking the point-locked mode of the positioning coordinate of the object (step S750); maintaining the point-locked mode of the positioning coordinate of the object (step S760); and locking the positioning coordinate of the object (step S770). The following will sequentially describe each step of the object positioning method in order to understand the contents of this disclosure.

In step S710, after the control circuit 130 records the positioning coordinate of the object (i.e. after performing step S520 of embodiment in FIG. 5), the process enters into step S710. Furthermore, the detecting circuit 120 continuously detects change of amount of capacitor with a fixed period according to force applied by the object F for the sensing module 110 and then the detecting circuit 120 transmits a detecting result RS to the control circuit 130. Afterwards, the control circuit 130 calculates amount of sensing of the sensing signal ES according to the detecting result RS. Next, the process enters into step S720.

In step S720, the control circuit 130 determines whether the positioning coordinate of the object F is in the point-locked mode. If the positioning coordinate is in the point-locked mode, the process enters into step S730; if else, the process enters into step S740.

In step S730, when the positioning coordinate of the object F is in the point-locked mode, the detecting circuit 120 still detects or samples the sensing signal ES of the sensing module 110 with a fixed period and then the detecting circuit 120 transmits the detecting result RS to the control circuit for decision of judgment. In the present step, the control circuit 130 may perform decision of judgment again; which means, the control circuit 130 determines whether amount of sensing of the sensing signal ES is larger than a first sensing threshold value Z1. If the control circuit 130 determines that amount of sensing of the sensing signal ES is larger than the first sensing threshold value Z1 according to decision of judgment, the process enters into step S750. If the control circuit 130 determines amount of sensing of the sensing signal ES is smaller than first sensing threshold value Z1 according to decision of judgment, the process enters into step S760.

In step S740, the control circuit starts to perform decision of judgment for two threshold conditions. Firstly, the first threshold condition is that the control circuit 130 determines whether amount of sensing of the sensing signal ES decreases continuously; which means, to determine whether time of decreasing continuously is larger than the first threshold time T1 (i.e. sensing time t1 to sensing time t2). The second threshold condition is that control circuit 130 simultaneously determines whether amount of sensing of the sensing signal ES is smaller than a first sensing threshold value Z1. It is worth mentioned that in the duration of decreasing continuously for amount of sensing of the sensing signal ES, the control circuit 130 may periodically capture amount of sensing of N sample sensing signals at N time-points for calculating a average value and the average value is served as amount of sensing of the sensing signal ES at different time-points, wherein N is positive integer larger than one. In the embodiment of FIG. 6, N is equal to three; which means, each point of the curve of amount of sensing E in the time duration of sensing time t1 to sensing time t1 is acquired from the average calculation of three sample sensing signal of three time-points. Accordingly, the instant disclosure can avoid generation of misjudgment due to affect of noise interference and can increase accuracy of determination for amount of sensing of the sensing signal ES in the duration of decreasing continuously.

If the first and the second threshold condition are true; which means, time of decreasing continuously of amount of sensing of the sensing signal ES is larger than the first threshold time T1 and amount of sensing of the sensing signal ES is smaller than the first sensing threshold value Z1, the process determined by the control circuit 130 enters into step S770. If one of the first and the second threshold condition (continuously time period larger than T1 and the amount of sensing smaller than Z1) is false, the process determined by the control circuit 130 enters into step S530 of the embodiment in FIG. 5. In the present embodiment, the first threshold time T1 is preset to 25 milliseconds and the first sensing threshold value Z1 is 25% of average amount of sensing of finger. However, setting for numerical value of the first threshold time T1 and the first sensing threshold value Z1 are not restricted in the present embodiment, and user can make appropriate adjustment for numerical value of the first threshold time T1 and the first sensing threshold value Z1 according to demand of actual application.

In step S750, at sensing time t3 as shown in FIG. 6, when the control circuit 130 determines amount of sensing of the sensing signal ES is larger than the first sensing threshold value Z1 according to decision of judgment, the control circuit 130 performs an action of unlocking the point-locked mode for the positioning coordinate of the object F according to the control command Afterwards, the object positioning method enters into step S530 in FIG. 5.

In step S760, when the control circuit 130 determines amount of sensing of the sensing signal ES is still smaller than the first sensing threshold value Z1 according to decision of judgment, the control circuit 130 maintains the point-locked mode for the positioning coordinate of the object F according to the control command Afterwards, the object positioning method returns to step S510 in FIG. 5 so as to do the subsequent related operation, and it is not repeated thereto.

In step S770, when the control circuit 130 determines time of reducing continuously for amount of sensing of the sensing signal ES is larger than the first threshold time T1 and amount of sensing of the sensing signal ES is smaller than the first sensing threshold value Z1 according to decision of judgment, the control circuit 130 may be locking the positioning coordinate of the object F. As shown in FIG. 6, time duration from sensing time t2 to sensing time t3 indicates the positioning coordinate enters into the point-locked mode. Afterwards, the process enters into step S510 of FIG. 5.

Accordingly, when the object F leaves from surface of the touch panel 100, the control circuit 130 determines the final positioning coordinate of the object F according to two-conditions of the first threshold time T1 and the first sensing threshold value Z1 so as to avoid misjudgment of the final positioning coordinate due to noise interference generated by surrounding environment of the touch panel.

It is to be clarified that, each step of embodiment in FIG. 7 is set for a need to instruct easily, and thus the sequence of the steps is not used as a condition in demonstrating the embodiments of the instant disclosure.

To sum up, the object positioning method provided by the instant disclosure is able to acquire the motion estimation vector through recording of the positioning coordinate and calculation of the sensing coordinate for the object. Next, the instant disclosure compares length of the motion estimation vector and the predetermined distance so as to acquire a comparison result and then updates the positioning coordinate according to the comparison result, for reducing interference of jitter and dither of the object resulted by noise.

In at least one of the embodiment of the instant disclosure, when the object leaves from surface of the touch panel, the instant disclosure determines the final positioning coordinate of the object according to two-conditions of the first threshold time and the first sensing threshold value, so as to avoid misjudgment of the final positioning coordinate due to noise interference generated by surrounding environment of the touch panel.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. An object positioning method, used for a touch panel, the object positioning method comprising:
 recording a positioning coordinate of an object;
 acquiring a sensing coordinate of the object according to calculation of a sensing signal;
 acquiring a motion estimation vector according to calculation of the positioning coordinate and the sensing coordinate;
 determining whether a length of the motion estimation vector is smaller than a predetermined distance;
 outputting the positioning coordinate, if the length of the motion estimation vector is smaller than the predetermined distance;
 outputting the positioning coordinate and using a comparison result as comparing the length of the motion estimation vector with a threshold to update the positioning coordinate to a position of the positioning coordinate, if the length of the motion estimation vector is larger than the predetermined distance;
 detecting an amount of sensing of the sensing signal;
 locking the positioning coordinate of the object, when the amount of sensing of the sensing signal decreases continuously to be larger than a first threshold time and the amount of sensing of the sensing signal is smaller than a first sensing threshold value; and
 unlocking the point-locked mode of the positioning coordinate of the object when the amount of sensing of the sensing signal is larger than a first sensing threshold value under a situation of the positioning coordinate of the object in the point-locked mode.

2. The object positioning method according to claim 1, wherein, in the step of updating position of the positioning coordinate, further comprising:
   calculating an object movement vector of the object according to the predetermined distance and the motion estimation vector; and
   updating the positioning coordinate to a position of sum of the positioning coordinate and the object movement vector,
   wherein direction of the object movement vector is unit vector of the motion estimation vector, and magnitude of the object movement vector is that the predetermined distance subtracted by the length of the motion estimation vector.

3. The object positioning method according to claim 1, wherein, after step of outputting the positioning coordinate, returning to step of acquiring the sensing coordinate of the object according to calculation of the sensing signal.

4. The object positioning method according to claim 1, wherein, before step of recording the positioning coordinate of the object, further comprising:
   detecting and confirming that the object touches the touch panel, wherein the touch panel is capacitive touch panel and the amount of change of capacitance of the capacitive touch panel is transformed to the sensing signal by a control circuit.

5. The object positioning method according to claim 1, wherein, after step of the length of the motion estimation vector being smaller than the predetermined distance, further comprising:
   locking the positioning coordinate of the object.

6. The object positioning method according to claim 1, wherein, when the amount of sensing of the sensing signal decreases continuously, an average value of amount of sensing of N sample sensing signal for N time-points is served as the amount of sensing of the sensing signal, wherein N is a positive integer larger than one.

7. The object positioning method according to claim 1, wherein the threshold is the predetermined distance.

8. An object positioning method, used for a touch panel, the object positioning method comprising:
   detecting an object moved on the touch panel and generating a plurality of sensing signals;
   acquiring a sensing coordinate of the object according to each of the sensing signals;
   acquiring a motion estimation vector of the object according to the sensing coordinates of the object according to the sensing signals;
   detecting an amount of sensing of each of the sensing signals;
   locking a positioning coordinate of the object when the amount of sensing of each of the sensing signals decreases continuously to be larger than a first threshold time and the amount is smaller than a first sensing threshold value;
   updating the positioning coordinate of the object if a length of the motion estimation vector is larger than a predetermined distance.

9. The method according to claim 8, wherein, in the step of updating the positioning coordinate, further comprising:
   calculating an object movement vector of the object according to the predetermined distance and the motion estimation vector; and
   updating the positioning coordinate to a position of sum of the positioning coordinate and the object movement vector,
   wherein direction of the object movement vector is unit vector of the motion estimation vector, and magnitude of the object movement vector is that the predetermined distance subtracted by the length of the motion estimation vector.

10. The method according to claim 8, further comprising:
    recording the positioning coordinate of the object; and
    outputting the positioning coordinate.

11. The method according to claim 10, wherein, before step of recording the positioning coordinate of the object, further comprising:
    detecting and confirming that the object touches the touch panel, wherein the touch panel is capacitive touch panel and the amount of change of capacitance of the capacitive touch panel is transformed to the sensing signal by a control circuit.

12. The method according to claim 8, wherein, further comprising:
    outputting the positioning coordinate if the length of the motion estimation vector is smaller than the predetermined distance, and
    locking the positioning coordinate of the object.

* * * * *